G. W. HALL & A. F. PFAFFLE.
VEHICLE-AXLE LUBRICATORS.
No. 195,269. Patented Sept. 18, 1877.
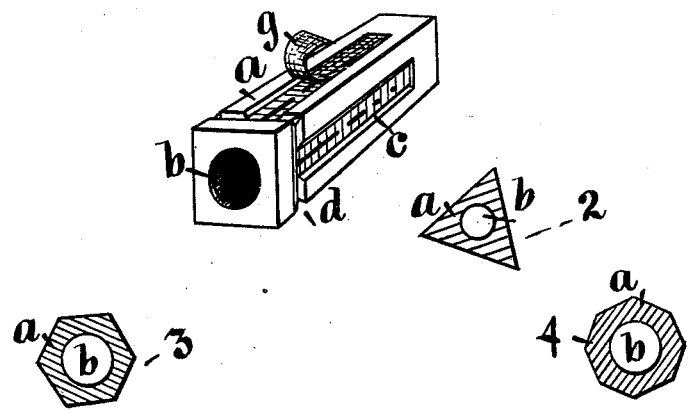
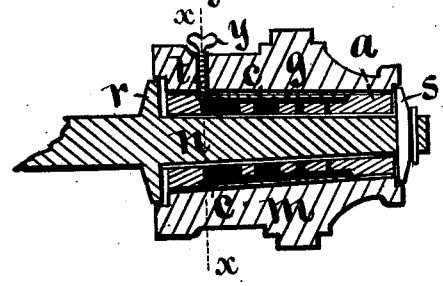
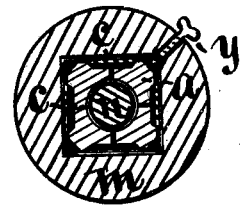
Witnesses:
B. Osgood
P. C. Kenyon
Inventors:
George W. Hall
Albert W. Pfaffle
By Thomas G. Orwig,
Attorney.

UNITED STATES PATENT OFFICE.

GEORGE W. HALL AND ALBERT F. PFAFFLE, OF WATKINS, IOWA.

IMPROVEMENT IN VEHICLE-AXLE LUBRICATORS.

Specification forming part of Letters Patent No. 195,269, dated September 18, 1877; application filed May 21, 1877.

*To all whom it may concern:*

Be it known that we, GEORGE W. HALL and ALBERT W. PFAFFLE, of Watkins, in the county of Benton and State of Iowa, have invented a Lubricating Axle-Box for Carriage-Wheels, of which the following is a specification:

The object of our invention is to mount a carriage-wheel upon an axle in such a manner that a supply of lubricating fluid can be carried concealed and protected in the hub, to be thereby gradually and automatically applied to the spindle, as required, to prevent friction.

It consists in bushing the hub with a metallic boxing of angular shape that has a series of connecting-reservoirs formed in its faces to contain and distribute the lubricant to the spindle as the wheel revolves, all as hereinafter fully set forth.

Figure 1 of our drawing is a perspective view illustrating the construction of our angular axle-box.

$a$ represents a four-sided tapering axle-box, designed to be fitted into a corresponding bore formed through the longitudinal center of a hub. $b$ is a round bore through the longitudinal center of the box $a$, designed to receive the spindle of the axle, upon which the complete wheel is to be mounted. $c\ c$ represent trough-form cavities or depressions, such as are formed in the four side faces of the box to form a series of reservoirs. $d$ is a continuous groove around the large end of the square box, and serves to connect the series of reservoirs $c$. $g$ represents a strip of flannel or other suitable packing, placed in the reservoirs $c$ to form valves, through which the lubricating fluid is allowed to pass slowly to enter the slots and perforations formed in the bottoms of the reservoirs to connect them with the central bore $b$.

Our axle-box is formed complete in one piece, of any suitable material, and may vary in size, as desired. It may be of triangular, hexagon, or octagon form in its cross-section, as represented by Figs. marked 2, 3, and 4 in our drawing.

Fig. 5 is a longitudinal central section of a hub on its spindle, and bushed with our axle-box. Fig. 6 is a cross-section view through the line $x\ x$ of Fig. 5. Together they illustrate the application and operation of our complete invention.

$m$ represents the round hub of a wheel, which hub may be made of wood or metal, and vary in form and dimensions, as desired. $n$ is the spindle of the axle, upon which our box $a$ and the complete hub and wheel revolve. $r$ is an annular flange on the axle, forming a shoulder at the base of the spindle $n$. This flange fits into a corresponding cavity formed around the angular bore of the hub, and serves to retain the lubricant on the spindle, and to exclude dust and other foreign substances. $s$ is a washer, fitted into the front end of the hub to retain the lubricant, and to exclude dirt. It is kept in place by means of a pin or a nut at the front end of the spindle $n$. $t$ is a perforation from the outside of the hub $m$, at a point where it intersects the groove $d$ connecting the reservoirs $c$.

The walls of the bore in the hub completely cover and close the series of reservoirs $c$, and through this hole $t$ they are readily filled at any time with oil or any other suitable lubricant in a fluid state. To close the hole and lock the box $a$ in the bore of the hub $m$ we insert a set-screw, $y$, in such a manner that it will enter the groove $d$ of the box $a$.

From the detailed description of the various parts of the complete bushed hub, the practical operation of our angular lubricating-box will be readily understood, and its advantages appear obvious.

Our improved axle-box is specially adapted for corn-cultivators and other carriages used in cultivated fields, but can be used advantageously upon all wheels that revolve upon spindles.

When wooden hubs are used our box $a\ b\ c$ may be inserted in an auxiliary box or sleeve of corresponding form and size to cover the reservoirs $c$, and prevent oil from escaping through the pores of the wood or the mortises in the hub.

We claim as our invention—

1. As an improved article of manufacture, an angular axle-box, $a$, having a round central bore, $b$, a series of reservoirs, $c$, and a continuous groove, $d$, substantially as and for the purposes shown and described.

2. The angular axle-box $a\ b\ c\ d$, in combination with the hub $m$, having a perforation, $t$, and the set-screw $y$, substantially as and for the purposes shown and described.

3. The angular axle-box $a\ b\ c\ d$, the packing $g$ in the reservoir $c$, the hub $m$, having depressions in its ends around its central bore, the axle-spindle $n$, having a flange or shoulder, $r$, at its base, and the washer $s$, secured on the front end of the spindle $n$, all arranged and combined to operate substantially as and for the purposes set forth.

GEORGE W. HALL.
ALBERT F. PFAFFLE.

Witnesses:
A. PFAFFLE,
JOHN CASE.